(12) United States Patent
Hirsch et al.

(10) Patent No.: US 6,627,171 B2
(45) Date of Patent: Sep. 30, 2003

(54) METHOD FOR PRODUCING IRON CARBIDE FROM GRANULATED SPONGE IRON

(75) Inventors: Martin Hirsch, Friedrichsdorf (DE); Michael Stroeder, Neu Anspach (DE); Peter Weber, Hammersbach (DE)

(73) Assignee: Metallgesellschaft AG, Frankfurt am Main (DE)

( * ) Notice: Subject to any disclaimer, the term of this patent is extended or adjusted under 35 U.S.C. 154(b) by 0 days.

(21) Appl. No.: 09/403,191

(22) PCT Filed: Mar. 28, 1998

(86) PCT No.: PCT/EP98/01839

§ 371 (c)(1), (2), (4) Date: Mar. 15, 2000

(87) PCT Pub. No.: WO98/48058

PCT Pub. Date: Oct. 29, 1998

(65) Prior Publication Data

US 2002/0061275 A1 May 23, 2002

(30) Foreign Application Priority Data

Apr. 24, 1997 (DE) .......................... 197 17 304

(51) Int. Cl.⁷ .............................. C01B 31/30
(52) U.S. Cl. ...................... 423/439; 423/148
(58) Field of Search ................ 423/148, 439

(56) References Cited

U.S. PATENT DOCUMENTS

| 5,137,566 | A | | 8/1992 | Stephens |
| 5,387,274 | A | | 2/1995 | Dam G. |
| 5,527,379 | A | * | 6/1996 | Hirsch et al. ............... 423/439 |
| 5,560,762 | A | * | 10/1996 | Bresser et al. ............. 423/439 |
| 5,690,717 | A | | 11/1997 | Steves |
| 5,733,357 | A | * | 3/1998 | Stephens, Jr. et al. ...... 423/439 |

FOREIGN PATENT DOCUMENTS

| DE | 33 17 701 A | 11/1984 |
| DE | 44 26 623 A | 7/1995 |
| DE | 196 21 412 A | 8/1997 |
| EP | 0 630 975 A | 12/1994 |
| FR | 2 360 670 A | 3/1978 |

OTHER PUBLICATIONS

Patent Abstracts of Japan, vol. 017. No. 678 (C–1141), Dec. 13, 1993 & JP 05 222423 A (Nippon Steel Corp.), Aug. 31, 1993 see abstract.

* cited by examiner

Primary Examiner—Steven Bos
(74) Attorney, Agent, or Firm—Norris McLaughlin & Marcus

(57) ABSTRACT

Process for producing Iron carbide wherein, in a first stage, Iron ore is reduced to sponge iron using a reducing gas containing at least 90% hydrogen, on a nitrogen-free basis, to produce a sponge iron having a carbon content of less than 1% wt.; then in a second stage the sponge iron is fluidized at a temperature of 500 to 800° C. with a methane-containing fluidizing gas in a fluidized bed reactor wherein the water content of the gas in the reactor is not more than 1.5% wt., to produce a product wherein at least 85% of the iron content is in the form of $Fe_3C$.

2 Claims, 1 Drawing Sheet

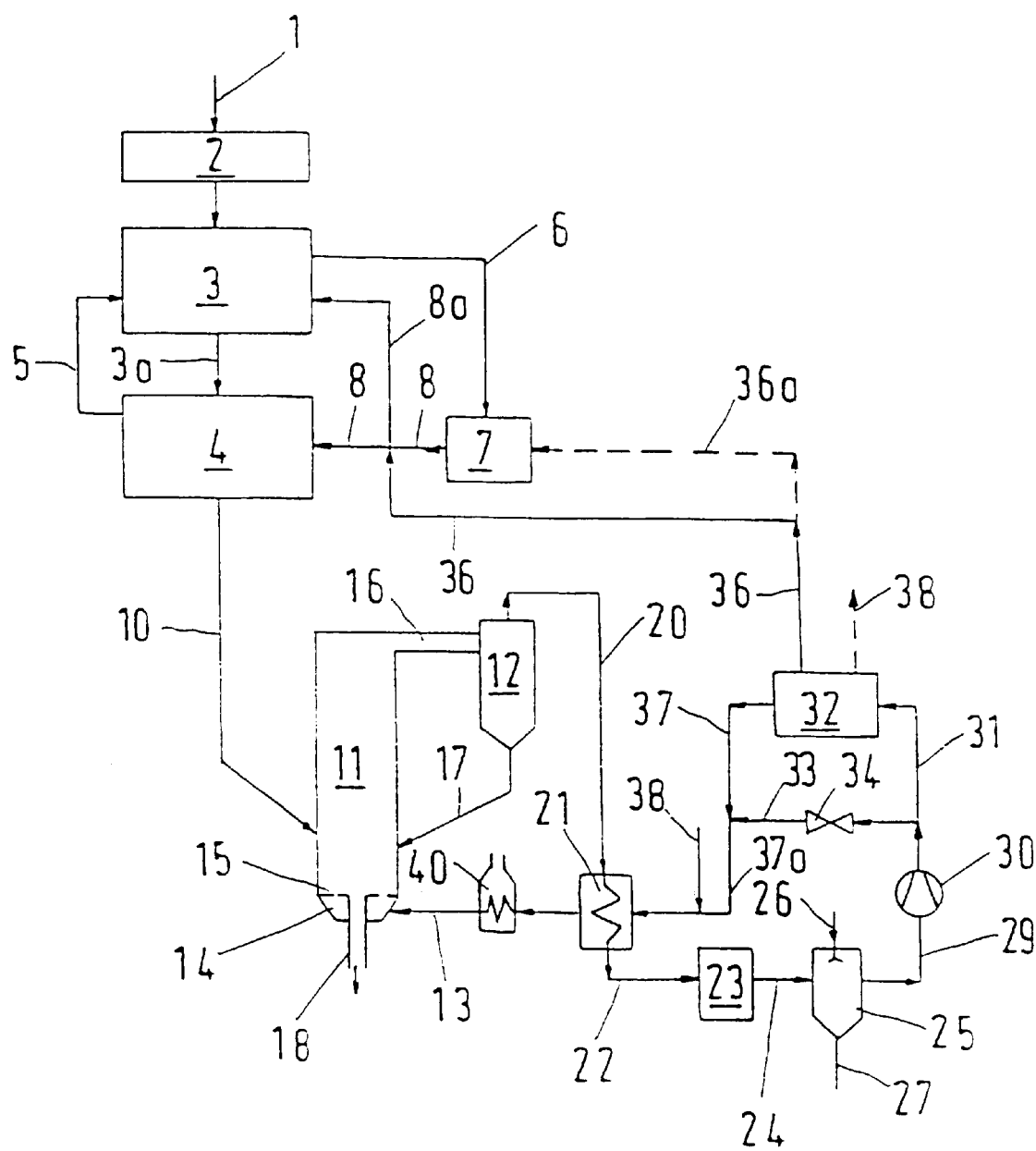

METHOD FOR PRODUCING IRON CARBIDE FROM GRANULATED SPONGE IRON

This invention relates to a process of producing iron carbide ($Fe_3C$) from granular sponge iron, which comes from an iron ore reduction plant with a carbon content of not more than 2 wt-%.

From the U.S. Pat. Nos. 5,527,379 and 5,603,748 the direct reduction of iron oxide is known, where in several fluidized beds granular, iron-oxide-containing material is brought in direct contact with hot reduction gas at temperatures of 500 to 900° C. When the reduction gas not only contains hydrogen, but also a considerable content of carbon monoxide, a product rich in $Fe_3C$ can be withdrawn from the last stage of the fluidized bed of the known reduction process. Practice has shown, however, that in the reduction of iron oxide to iron the steam produced greatly impedes the simultaneous formation of iron carbide as a result of the reaction of iron with Co and/or $CH_4$.

It is therefore the object underlying the invention to omit the simultaneous production of iron carbide ($Fe_3C$) during the direct reduction of iron oxide and the formation of sponge iron. In accordance with the invention iron carbide is produced by means of the above-mentioned process such that the sponge iron, which has a carbon content of not more than 2 wt-%, is swirled in a fluidized-bed reactor at temperatures of 500 to 800° C. with a carbonaceous gas whose water content is not more than 1.5 vol-%, and that from the reactor a product is withdrawn, whose total iron content is bound as $Fe_3C$ for at least 80 wt-%. Preferably, at least 85 wt-% of the total iron content of the product withdrawn are bound as $Fe_3C$.

In the process in accordance with the invention, carburizing the low-carbon sponge iron is deliberately effected separate from the reduction plant. This requires a more complex apparatus than the known production of iron carbide, but the reduction plant is relieved considerably in the process in accordance with the invention. Now, the reduction plant is preferably operated with hydrogen-rich gas as reduction gas, which contains only little CO or is virtually free from CO. During the carburization a $H_2$-containing gas is produced, and this hydrogen can advantageously be utilized upon separation in the reduction plant. It is recommended to form the reduction gas supplied to the fluidized bed of the last reduction stage from hydrogen for at least 80 vol-% (calculated free from nitrogen). Then, the granular sponge iron, which is supplied to the fluidized-bed reactor for carburization, usually has a carbon content of not more than 1 wt-%.

For carburizing in the fluidized-bed reactor gases rich in hydrocarbon are used, which in the reactor may also serve as fluidizing gases. As gas rich in hydrocarbon there might for instance be used methane or methane-containing natural gas. To accelerate the carburization, the fluidized-bed reactor is operated at pressures in the range from 3 to 10 bar. In the fluidized-bed reactor, the solids may form a stationary fluidized-bed, or they may be held in the state of the circulating fluidized bed. In the latter case, the reactor comprises a separator for the separation of solids, which is connected with the upper part of the reactor, and from which separated solids are recirculated to the lower part of the reactor. Per hour, at least 5 times the weight of solids is recirculated, as compared with the solids content in the reactor.

BRIEF DESCRIPTION OF THE DRAWING

Embodiments of the process will now be explained with reference to the drawing. It represents a flow diagram of the process.

From granular iron oxide, which is supplied via line 1, there is first of all produced by means of reduction sponge iron with a carbon content of not more than 2 wt-% and preferably not more than 1 wt-%. The reduction may be effected in any manner known per se. An advantageous procedure is described in the already mentioned U.S. Pat. Nos. 5,527,379 and 5,603,748, where a drying and heating stage 2 is followed by a first reduction stage 3 and a subsequent second reduction stage 4. In both reduction stages the reduction is effected in a fluidized bed, where hot, hydrogen-containing gas is used as reduction and fluidizing gas. The temperatures in both stages 3 and 4 lie in the range from 500 to 900° C. The first stage 3 is designed as circulating fluidized bed, to which at least in part used, $H_2$-containing reduction gas from the second stage 4 is supplied through line 5. The exhaust gas of the first stage is recirculated via line 6 to a processing plant 7, in which there is also produced fresh gas rich in hydrogen. The gas is supplied as hot reduction gas through line 8 to the second reduction stage 4, in which the solids preferably form a stationary fluidized bed. Preferably, the gas of line 8 comprises at least 80 vol-%, and mostly at least 90 vol-% hydrogen. A partial stream of the reduction gas of line 8 is expediently supplied directly to the first stage 3 through line 8a. The degree of metallization of the partly reduced ore of line 3a is about 50 to 80%.

From the second reduction stage, granular sponge iron with a carbon content of not more than 2 wt-% and preferably not more than 1 wt-% is withdrawn via line 10. This sponge iron is charged into a fluidized bed reactor 11, which is connected with a cyclone separator 12. For carburizing the sponge iron, gas rich in hydrocarbon, which for instance chiefly consists of methane, is supplied through line 13. This gas first of all flows into a distribution chamber 14 and then as fluidizing gas through a tuyere bottom 15 upwards through the reactor 11. In the reactor 11 the temperatures lie in the range from 500 to 800° C. A gas-solids suspension is supplied from the upper part of the reactor 11 through the passage 16 into the separator 12, and separated solids are recirculated to the reactor 11 through line 17. The product withdrawn through the passage 18 from the lower part of the reactor 11 chiefly consists of iron carbide, where at least 80 wt-% of the total iron content are bound as $Fe_3C$. This product is supplied to a cooling unit not represented.

Solids-containing gas leaves the separator 12 through line 20 and first gives off heat in the heat exchanger 21. Due to the carburization, the gas of line 20 has a considerable hydrogen content, so that the $H_2$ content, calculated anhydrous, will be at least 10 vol-%. Expediently, there should be ensured a $H_2$ content in the gas of line 20 of 15 to 40 vol-% (calculated dry). For dedusting, the gas is first supplied to a filter 23 through line 22, and is then supplied to a wet scrubbing unit 25 via line 24. In the scrubbing unit 25 washing solution is sprayed in through line 26, and used, solids-containing washing solution is withdrawn via line 27. Cleaned gas is sucked in via line 29 by means of the blower 30. It is very advantageous to at least partly separate the hydrogen content of the gas and utilize the same in the reduction plant. For this purpose, the gas is wholly or partly supplied through line 31 to a separating means 32 for separating a gas fraction rich in $H_2$ from the gas mixture. If desired, a partial stream of the gas coming from the blower 30 may be guided past the separating means 32 through the bypass line 33 and the opened valve 34.

The separating means 32 may operate in a manner known per se, for instance according to the principle of pressure-swing adsorption, or may be designed as membrane separation. Furthermore, it is possible to effect a gas separation by means of deep cooling. In addition to a gas fraction rich in $H_2$, which is discharged via line 36, a residual gas is obtained from the separating means 32, which residual gas is withdrawn via line 37. When a purge gas is used, such as in the case of a pressure-swing adsorption plant, the latter is withdrawn via line 38 indicated in broken lines. The residual gas of line 37 is mixed with the gas of line 33 and fortified by gas rich in hydrocarbon, e.g. methane, from line 38a, The gas mixture, which serves as carburizing gas, is passed via line 37a for heating purposes first through the heat exchanger 21 and then through the fired heater 40, before it is fed into the reactor 11 through line 13.

When the $H_2$-rich gas of line 36 is already suited as reduction gas, it may directly be admixed to the reduction gas of line 8. Otherwise, this gas is supplied to the processing plant 7 through line 36a indicated in broken lines.

EXAMPLE

A procedure corresponding to the drawing involves the production of 600 000 t $Fe_3C$ per year from an iron ore with an Fe content of 67 wt-%, which comprises 96 wt-% $Fe_2O_3$. In addition to other gangue, the ore contains 2.4 wt-% $SiO_2$. The data have been calculated in part. In the first reduction stage 3, which is designed as circulating fluidized bed, the solids temperature is 630° C., and in the stationary fluidized bed of the second reduction stage 4 the temperature is 640° C.

The reduction gas of line 8 comprises 90 vol-% $H_2$ and still contains 9 vol-% N2 and 1 vol-% $H_2O$.

The sponge iron of line 10 has a content of metallic Fe of 88.0 wt-%, an FeO content of 8.5 wt-%, and it contains 3.5 wt-% $SiO_2$; the carbon content is negligibly small.

For carburizing, sponge iron is supplied to the reactor 11 in an amount of 63.6 t per hour, the pressure in the reactor is about 4 bar, the temperature is 600° C. In the various lines, the following gas quantities flow, and their temperatures and their components $CH_4$, $H_2$ and $H_2O$ are indicated in the table.

The separating means (32) is a pressure-swing adsorption plant, and 9300 $Nm^3$/h $CH_4$ are withdrawn through line 38a. The product withdrawn from the reactor 11 comprises 89 wt-% $Fe_3C$, 8 wt-% FeO and 3 wt-% $Sio_2$.

What is claimed is:

1. A process of producing iron carbide ($Fe_3C$) from granular sponge iron, comprising the steps of (a) reducing iron ore in an iron-ore-reduction plant, said reduction plant comprising at least two reduction stages operating in series, the iron ore being fed into a first reduction stage and partly reduced iron ore from a preceding reduction stage is fed into a last reduction stage of said reduction plant, said last reduction stage comprising a stationary fluidized bed of partly reduced iron ore which is treated at temperatures in the range from 500 to 800° C. and reduction gas is supplied into said bed, said reduction gas contains at least 90 percent by volume hydrogen, on a nitrogen-free basis, granular sponge iron with a carbon content of not more than 1 percent by weight is produced in and withdrawn from said last reduction stage, (b) said withdrawn sponge iron is treated in circulating fluidized bed comprising a fluidized bed reactor, a separator connected with the upper portion of the reactor for separating solids, and a solids return line between the separator and the lower portion of the reactor, where per hour at least five times the weight of solids, as compared to the solids content in the reactor, is recirculated from the separator into the reactor, the sponge iron is fluidized in the fluidized-bed reactor at temperatures of 500 to 800° C. with a fluidizing gas comprising methane, the water content of the gas in the reactor being not more than 1.5 vol. %, from the separator a gas with a $H_2$ content of 10 to 40 vol. %, calculated anhydrous, is withdrawn, and part of said gas from the separator is recirculated to the reactor upon addition of methane, and from the fluidized bed

| Line | 13 | 20 | 31 | 33 | 36 | 37 | 38a |
|---|---|---|---|---|---|---|---|
| Gas quantity ($Nm^3$/h) | 128,400 | 135,700 | 49,800 | 85,500 | 14,300 | 33,600 | 9,300 |
| Temperature (° C.) | 730 | 600 | 85 | 60 | 40 | 40 | 25 |
| $CH_4$ (vol-%) | 79.2 | 69.6 | 69.6 | 69.6 | — | 98.7 | 100 |
| $H_2$ (vol-%) | 19.8 | 29.5 | 29.5 | 29.5 | 100 | — | — |
| $H_2O$ (vol-%) | 1 | 0.9 | 0.9 | 0.9 | — | 1.3 | — | reactor a product is withdrawn, whose total iron content is bound as $Fe_3C$ in an amount of at least 85 wt. %.

2. The process according to claim 1 wherein the pressure in the fluidized-bed reactor in which the sponge iron is treated is from 3 to 10 bar.

* * * * *